(12) United States Patent
Katano et al.

(10) Patent No.: US 10,507,736 B2
(45) Date of Patent: Dec. 17, 2019

(54) VEHICLE

(71) Applicant: TOYOTA JIDOSHA KABUSHIKI KAISHA, Toyota-shi, Aichi-ken (JP)

(72) Inventors: Koji Katano, Toyota (JP); Akiyoshi Furuzawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 67 days.

(21) Appl. No.: 14/935,716

(22) Filed: Nov. 9, 2015

(65) Prior Publication Data

US 2016/0137098 A1    May 19, 2016

(30) Foreign Application Priority Data

Nov. 14, 2014  (JP) ................. 2014-231812

(51) Int. Cl.
*B60L 58/40* (2019.01)
*B60L 11/18* (2006.01)
*H01M 16/00* (2006.01)

(52) U.S. Cl.
CPC .......... *B60L 11/1887* (2013.01); *B60L 58/40* (2019.02); *H01M 16/006* (2013.01); *H01M 2220/20* (2013.01); *H01M 2250/20* (2013.01); *Y02T 90/32* (2013.01); *Y02T 90/34* (2013.01)

(58) Field of Classification Search
CPC .... B60K 1/00; B60L 11/1887; H01M 16/006; Y02T 90/32
USPC ........................................ 307/10.1; 180/65.1
See application file for complete search history.

(56) References Cited

U.S. PATENT DOCUMENTS

| 3,902,565 A * | 9/1975 | Farrall ................. B60K 1/00 180/65.1 |
| 4,136,432 A | 1/1979 | Melley, Jr. |
| 7,270,202 B2 * | 9/2007 | Kondo ................. B60K 1/00 180/65.1 |
| 2005/0093287 A1 | 5/2005 | Kondo |
| 2006/0121795 A1 * | 6/2006 | Hashimura ......... B60K 15/063 439/681 |
| 2011/0300427 A1 * | 12/2011 | Iwasa ................. B60K 1/04 429/99 |
| 2013/0187449 A1 | 7/2013 | Mouri et al. |

FOREIGN PATENT DOCUMENTS

| CN | 103213509 A | 7/2013 |
| DE | 60320653 T2 | 6/2009 |
| JP | 2011-225115 A | 11/2011 |

(Continued)

*Primary Examiner* — Alfonso Perez Borroto
(74) *Attorney, Agent, or Firm* — Finnegan, Henderson, Farabow, Garrett & Dunner, LLP

(57) ABSTRACT

Disclosed is a vehicle, which is capable of preventing direct input of an impact to an external power feeding device that stores a high-voltage component, and is capable of protecting the external power feeding device. A vehicle 100 includes: an external power feeding device 70 that stores a high-voltage component for performing external power feeding; and a secondary battery 60 that stores a part of electric power, both of which are provided in a rear in a travel direction of the vehicle 100. The external power feeding device 70 is disposed in front of a rear end 61 of the secondary battery 60, and is disposed below a lower end 62 of the secondary battery 60 in a vertical direction when viewed from a side.

5 Claims, 10 Drawing Sheets

(56) References Cited

FOREIGN PATENT DOCUMENTS

| JP | 2013-119326 A | 6/2013 |
|----|---------------|--------|
| JP | 2013-151193 A | 8/2013 |
| JP | 2013-193611 A | 9/2013 |
| JP | 2014-051172 A | 3/2014 |
| JP | 2014-131432   | 7/2014 |

\* cited by examiner

VEHICLE

BACKGROUND OF THE INVENTION

Field of the Invention

The present invention relates to a structure of a vehicle including an external power feeding device that houses a high-voltage component for performing external power feeding.

Background Art

A fuel cell stack is a power generation system that oxidizes fuel by an electrochemical process, and thereby converts energy, which is emitted following an oxidation reaction, directly into electric energy. The fuel cell stack includes a membrane electrode assembly composed in such a manner that both side surfaces of a polymer electrolyte membrane for selectively transporting hydrogen ions is sandwiched by a pair of electrodes made of a porous material. Each of the pair of electrodes includes: a catalyst layer that contains, as a main component, carbon powder supporting a platinum-based metal catalyst, and is brought into contact with the polymer electrolyte membrane; and a gas diffusion layer that is formed on a surface of the catalyst layer and combines air permeability and electron conductivity.

A fuel cell vehicle mounting a fuel cell system as a power source thereon runs by driving a traction motor by electricity generated in the fuel cell stack. In recent years, the fuel cell vehicle has attracted attention also as a power generation device capable of external power feeding. As such a fuel cell vehicle, there is a vehicle including an external power feeding device for feeding an outside with electric power generated in the fuel cell stack. As the external power feeding device, a device including an inverter circuit is known.

As a technology related to the vehicle including the external power feeding device, for example, there is disclosed a fuel cell vehicle in which a power feeding contactor (external power feeding device) storing a high-voltage component is disposed beside a high-pressure tank in a vehicle width direction (refer to Patent Document 1).

CITATION LIST

Patent Document

[Patent Document 1] JP2014-131432 A

SUMMARY OF THE INVENTION

Incidentally, in a casing of the external power feeding device, a component with a high voltage (for example, 200 V or more) is housed. Therefore, if the external power feeding device storing the high-voltage component is disposed beside the high-pressure tank, then an impact caused by a rear collision or a side collision is directly inputted to the external power feeding device, it becomes necessary to mechanically strengthen the casing of the external power feeding device, and in such a way, the external power feeding device becomes necessarily heavy.

In this connection, the present invention has been created in consideration of the above-described circumstance, and it is an object of the present invention to provide a vehicle, which is capable of preventing the direct input of the impact to the external power feeding device that stores the high-voltage component, and is capable of protecting the external power feeding device.

In order to achieve the above-described object, a vehicle according to the present invention is a vehicle including: an external power feeding device that stores a high-voltage component for performing external power feeding, the external power feeding device being provided in a rear in a vehicle length direction; and a secondary battery that stores a part of electric power, the secondary battery being provided in the rear in the vehicle length direction, wherein the external power feeding device is disposed in front of a rear end of the secondary battery, and is disposed below a lower end of the secondary battery in a vertical direction when viewed from a side.

In the above-described configuration of the vehicle, preferably, the vehicle further includes: a high-pressure tank for reserving fuel, the high-pressure tank being provided in the rear in the vehicle length direction, wherein the external power feeding device is disposed in front of a normal from the secondary battery, the normal being a straight line passing through an axial center of the high-pressure tank.

More preferably, the external power feeding device is disposed in front of a front end of the high-pressure tank.

Moreover, preferably, the external power feeding device is disposed through a fixing member on a floor in a rear in a travel direction of the vehicle, and a notched portion is provided in the fixing member.

Furthermore, preferably, the external power feeding device is disposed in an inside in a vehicle width direction from both ends of either one or both of the secondary battery and the high-pressure tank.

In a case where the vehicle including the external power feeding device according to the present invention receives the rear collision, even in a case where a first impact is applied to the secondary battery, and the secondary battery is configured to pass above the external power feeding device, to slide forward, and to release the impact, then the vehicle can prevent the impact by the secondary battery from being directly inputted to the external power feeding device, and can protect the external power feeding device from the impact.

DESCRIPTION OF THE PREFERRED EMBODIMENTS

Figure 1:
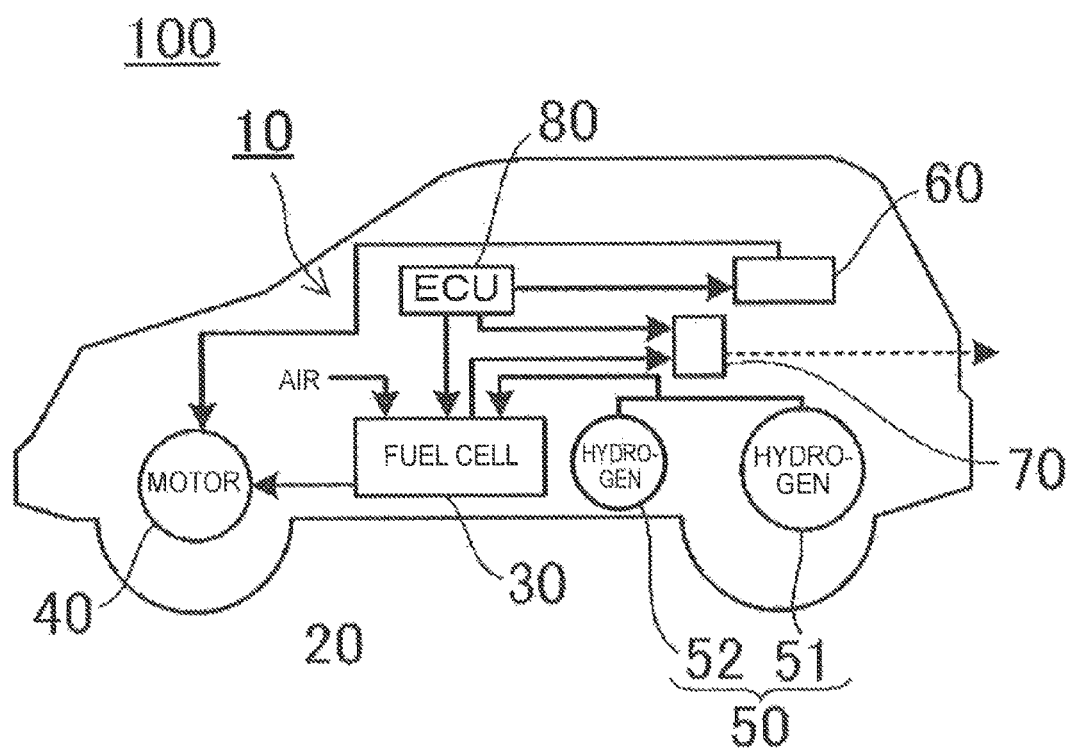
FIG. 1 is a schematic view of a fuel cell vehicle mounting an external power feeding device thereon.

A description is made below of embodiments of the present invention. In the following description referring to the drawings, the same or similar portions are denoted by the same or similar reference numerals. Note that the drawings are schematic. Hence, specific dimensions and the like should be determined by checking the following description. Moreover, it is a matter of course that portions mutually different in dimensional relationship and ratio from one another are also incorporated in the drawings.

First Embodiment

Figure 2:
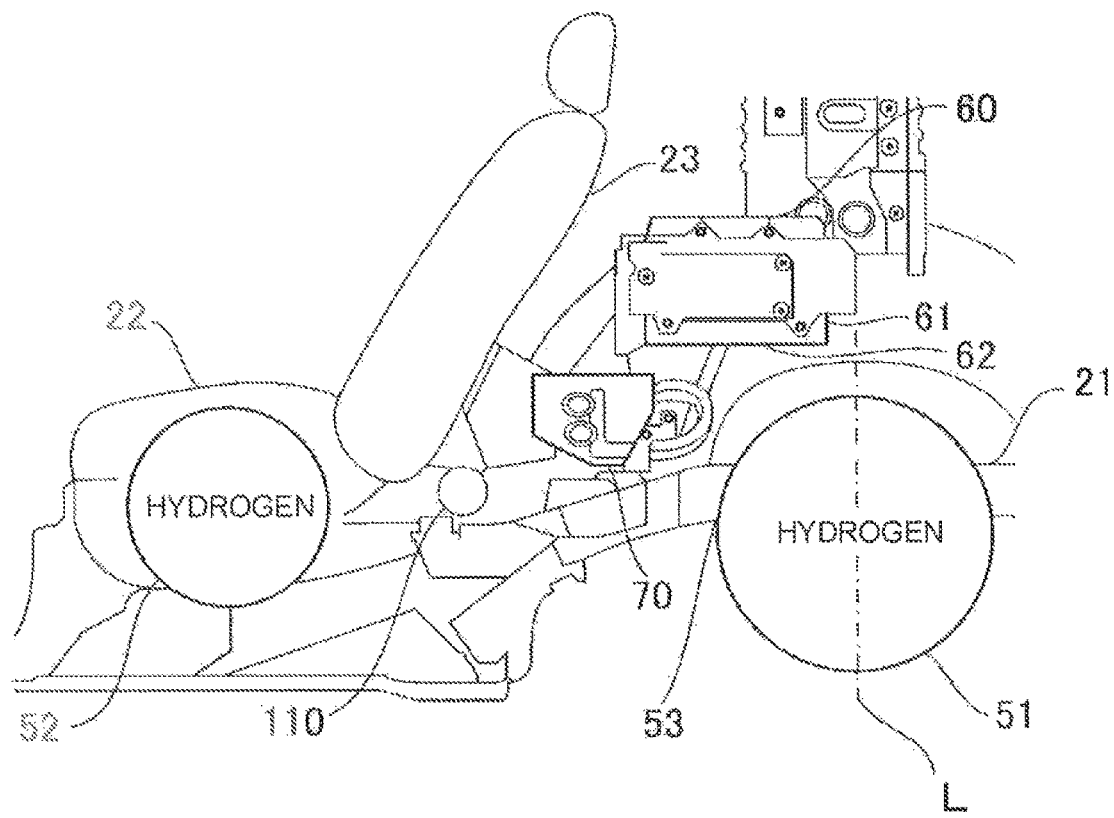
FIG. 2 is a side view of a vehicle including an external power feeding device according to a first embodiment of the present invention.

First, a description is made of a vehicle including an external power feeding device according to a first embodiment of the present invention with reference to FIG. 1 to FIG. 5. FIG. 1 is a schematic view of a fuel cell vehicle mounting an external power feeding device thereon. FIG. 2 is a side view of a vehicle including an external power feeding device according to a first embodiment of the present invention. As shown in FIG. 1 and FIG. 2, a vehicle 100 according to the first embodiment is a fuel cell vehicle that mounts a fuel cell system 10 thereon. The fuel cell system 10 functions as an in-vehicle power supply system, and mainly includes a fuel cell 30, a secondary battery 60 and an external power feeding device 70.

The fuel cell vehicle 100 runs by driving a traction motor 40 by electricity generated in the fuel cell 30. The fuel cell 30 is supplied with hydrogen as fuel gas from a high-pressure tank 50, and in addition, is supplied with air. The high-pressure tank 50 is mounted on rear of the vehicle 100 in a travel direction (vehicle length direction). Two high-pressure tanks 51 and 52 are mounted on the vehicle 100 according to this embodiment, the first high-pressure tank 51 is mounted under a rear floor 21, and the second high-pressure tank 52 is mounted under a rear seat 22.

The fuel cell 30 is composed of a stack structure in which a plural of cells are stacked on one another (hereinafter, referred to as a fuel cell stack). For example, a cell of a polymer electrolyte fuel cell at least includes: a membrane electrode assembly (MEA) composed of an ion-permeable electrolyte membrane, and an anode-side catalyst layer (electrode layer) and a cathode-side catalyst layer (electrode layer), which sandwich the electrolyte membrane; and gas diffusion layers for supplying the membrane electrode assembly with fuel gas and oxidant gas. The cell of the fuel cell is sandwiched by a pair of separators. The fuel cell stack 30 is controlled by an electronic control unit (ECU) 80.

The secondary battery 60 is a storage battery (battery) for storing a part of electric power generated in the fuel cell stack 30. The secondary battery 60 is electrically connected to the fuel cell stack 30. The secondary battery 60 functions as a storage supply of surplus power, a regenerative energy storage supply at a time of regenerative braking, and an energy buffer at a time when a load varies following acceleration or deceleration of the fuel cell vehicle 100. The secondary battery 60 is mounted on the rear of the vehicle 100 in the travel direction. As shown in FIG. 2, the secondary battery 60 of this embodiment is provided on a rear floor 21 through a battery carrier 65 (refer to FIG. 10) on rear of a seat back 23 of the rear seat 22. As the secondary battery 60, for example, a storage battery such as a nickel/cadmium storage battery, a nickel/hydrogen storage battery, and a lithium-ion storage battery is suitable; however, is not limited to the battery thus exemplified.

Figure 3:
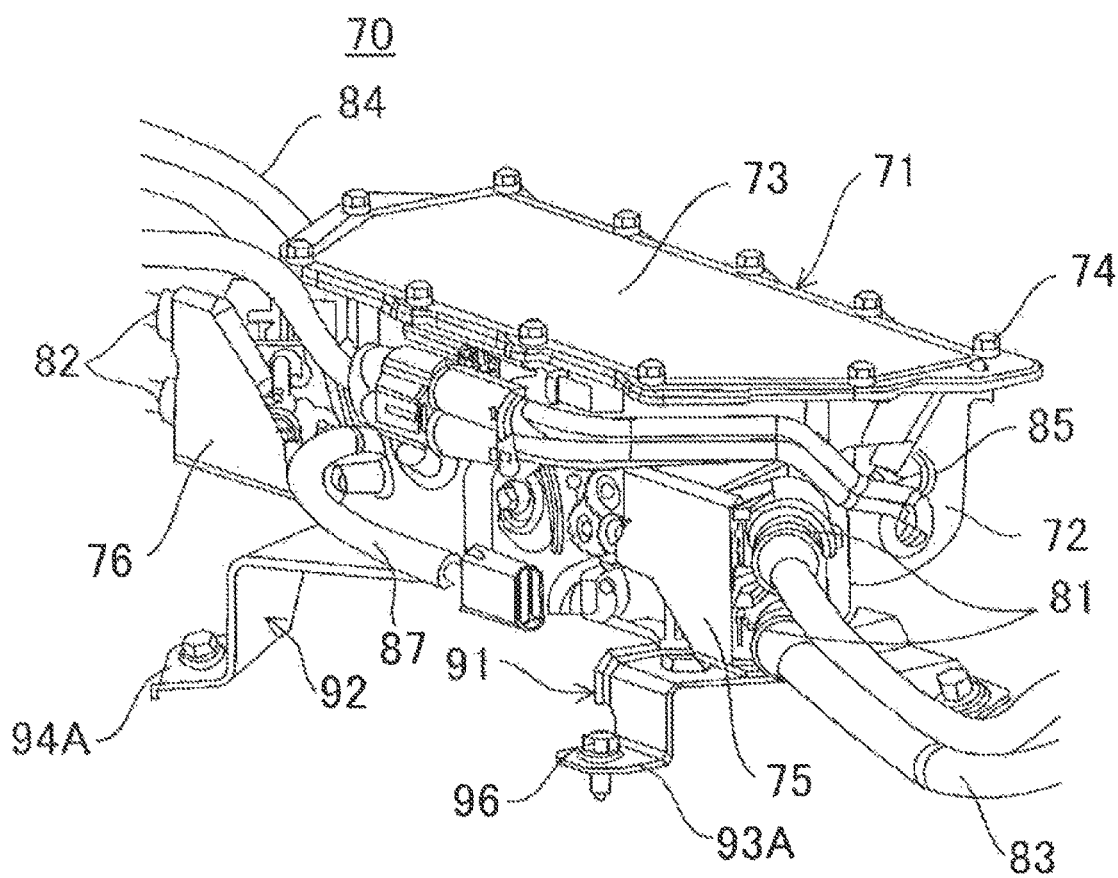
FIG. 3 is a perspective view when the external power feeding device in the first embodiment of the present invention is viewed from a DC output connector side.
Figure 4:
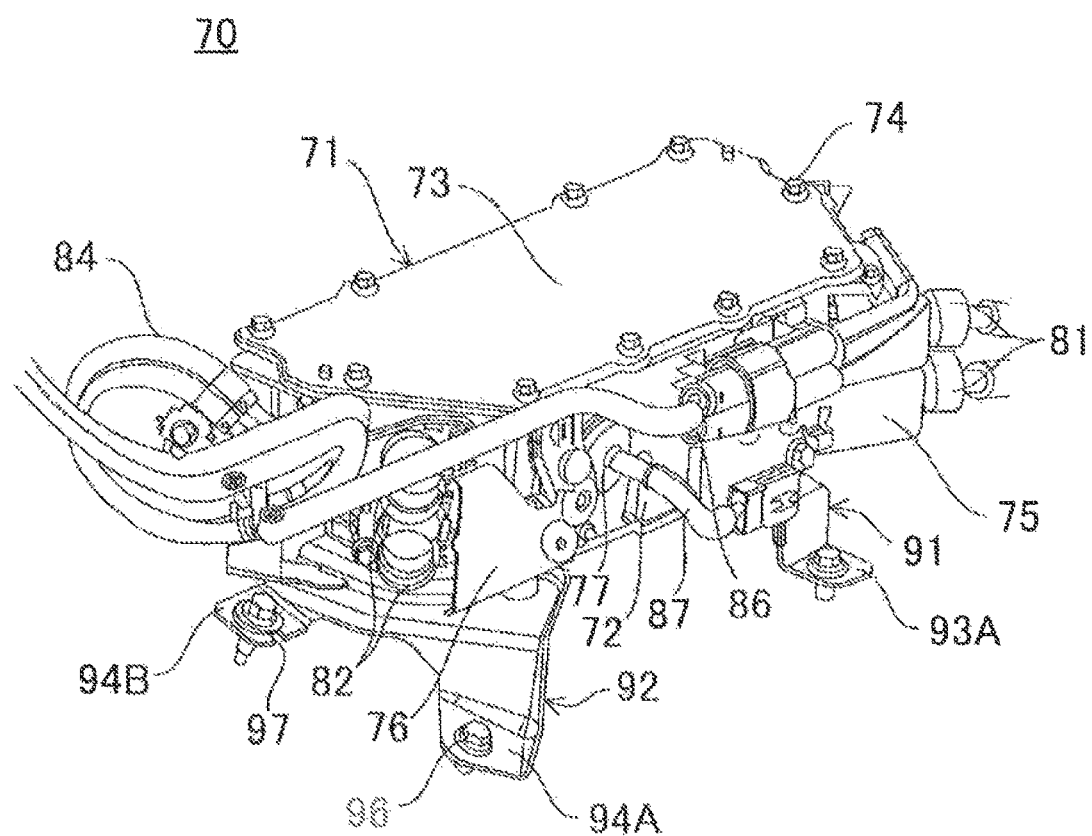
FIG. 4 is a perspective view when the external power feeding device in the first embodiment of the present invention is viewed from a PCU output connector side.
Figure 5:
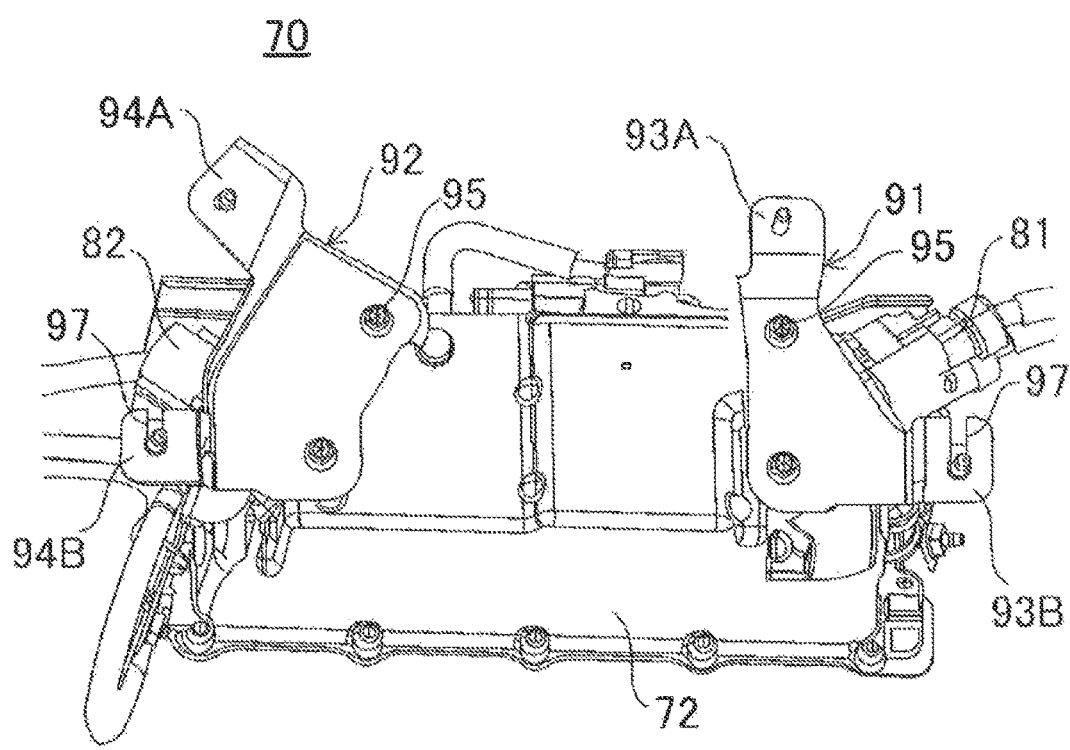
FIG. 5 is an appearance view when the external power feeding device in the first embodiment of the present invention is viewed from a bottom side.

Next, a description is made of the external power feeding device 70 in this embodiment with reference to FIG. 3 to FIG. 5. FIG. 3 is a perspective view when the external power feeding device according to the first embodiment of the present invention is viewed from a DC output connector side. FIG. 4 is a perspective view when the external power feeding device according to the first embodiment of the present invention is viewed from a PCU output connector side. FIG. 5 is an appearance view when the external power feeding device in the first embodiment of the present invention is viewed from a bottom side.

The external power feeding device 70 is a device that houses a high-voltage component for feeding power to an outside. The external power feeding device 70 includes, for example, an inverter circuit, a relay, a fuse and the like, and is electrically connected to the fuel cell stack 30. As shown in FIG. 3 and FIG. 4, the external power feeding device 70 includes a casing 71 that houses the high-voltage component. The casing 71 is composed of: a casing body 72 as a container; and a lid body 73 that hermetically closes an upper opening portion of the casing body 72. The lid body 73 when viewed from above exhibits, for example, a scalene pentagon, and a plurality of bolts 74 are fastened thereto, whereby the lid body 73 hermetically closes the casing body 72 so that the casing body 72 can be openable. Note that an exterior shape of the casing 71 is not limited to such an exterior shape as illustrated in FIG. 3.

On both end portions of the casing body 72, there are provided direct current (DC) output connectors 81 and power control unit (PCU) output connectors 82, which are for performing energization of a high-voltage current. In the first embodiment, the DC output connectors 81 are provided so as to obliquely face the front of the vehicle. As reasons for providing the DC output connectors 81 so that the DC output connectors 81 can obliquely face the front of the vehicle, there are mentioned: the matter that, in order to directly take out the high-voltage current from the casing body 72, it is necessary to set a direction of the DC output connectors 81 to a direction where it is easy to take out the high-voltage current since a grommet becomes large in terms of a structure; the matter that, since a diameter of DC output cables 83 becomes large and roots thereof are less likely to be bent in a case where charge connectors (not shown) on tip end portions of the DC output cables 83 are according to the Chademo system, it is necessary to adopt a structure in which it is easy to wire the DC output cables 83 beside the secondary battery 60; and the like. Meanwhile, the PCU output connectors 82 are provided so as to obliquely face the front of the vehicle in a similar way. As reasons for providing the PCU output connectors 82 so that the PCU output connectors 82 can obliquely face the front of the vehicle, there are mentioned: the matter that, in order to directly take out the high-voltage current from the casing body 72, it is necessary to set a direction of the PCU output connectors 82 to a direction where it is easy to take out the high-voltage current since a grommet becomes large in terms of a structure; the matter that, since such wires can be detoured to the front of the battery carrier 65 (refer to FIG. 10) by obliquely taking out the wires, workability from the rear seat 22 side can be ensured, and it is enabled to wire the wires from a lower side of the casing body 72; and the like. Since the connectors 81 and 82 are structure portions which deliver the high-voltage currents, connector covers 75 and 76 which cover lock portions (not shown) of the connectors 81 and 82 are attached to the casing body 72.

As shown in FIG. 4, output cables (battery cables) 84 for making connection from the external power feeding device 70 to the secondary battery 60 are wired from a rear side of the PCU output connectors 82 of the casing body 72 toward the secondary battery 60. The external power feeding device 70 is disposed on the rear of the vehicle, and it is difficult to do work for the external power feeding device 70 from the rear seat 22 side, and accordingly, connection positions of the output cables 84 are set on the secondary battery 60 side above the external power feeding device 70. Moreover, as shown in FIG. 3, an AC (alternating current) output unit 85 is provided on a rear side of the DC output connectors 81. The AC output unit 85 is provided at a position of the casing 71 on an opposite side with output portions of the output cables 84 from the casing 71, the output cables 84 being directed toward the secondary battery 60, and the AC output unit 85 is subjected to cable connection in front of the casing body 72. With such a configuration, it is possible to reduce an overall length of the external power feeding device 70. Note that it is advantageous to wire these cables on an upper surface of the lid body 73 or in front of the casing body 72 in a case of considering only easiness of working; however, at least when the cables are wired on the upper surface of the lid body 73, such a possibility occurs that the wires may be brought into contact with the secondary battery 60, and accordingly, it becomes necessary to reinforce the cables. The cable connection of the AC output unit 85 is performed in front of the casing body 72. A signal connection cable 87 comes out from a front surface of the casing body 72, and is subjected to the cable connection in front of the casing body 72. The signal connection cable 87 may be broken in an unlikely event of collision, and accordingly, is taken out from a through portion 77 on the front surface of the casing body 72, which is shown in FIG. 4. From a viewpoint of facilitating wiring work of the signal connection cable 87, it is reasonable to provide the through portion 77 of the signal connection cable 87 for the signal connection cable on the casing 71 side.

As shown in FIG. 3 to FIG. 5, the external power feeding device 70 is disposed on the rear floor 21 through fixing members 91 and 92. As shown in FIG. 5, the fixing members 91 and 92 are attached to a bottom portion of the external power feeding device 70 by fastening members 95 such as bolts, each thereof is formed as an integrated body through front and rear portions thereof, and for example, the fixing members 91 and 92 exhibit a protruding shape when viewed from a side, and exhibit a substantially L-shape and a substantially U-shape when viewed from a bottom. Each of the fixing members 91 and 92 is formed as an integrated body through the front and rear portions thereof, and accordingly, can be positioned after upsizing thereof is minimized.

As shown in FIG. 3 and FIG. 4, pedestal portions 93A, 93B, 94A and 94B of the fixing members 91 and 92 are fixed to the rear floor 21 by fastening members 96 such as bolts. The pedestal portions 93A and 94A as one-side portions are disposed in front of the external power feeding device 70. As shown in FIG. 5, the pedestal portions 93B and 94B as other-side portions are disposed on sides of the external power feeding device 70. Notched portions 97 are formed in the pedestal portions 93B and 94B on the sides (rear). The notched portions 97 are opened forward of the pedestal portions 93B and 94B, and are formed along a longitudinal direction of the vehicle. That is to say, the pedestal portions 93B and 94B on the sides (rear) have the notched portions 97 formed therein, and thereby have a structure from which the fastening members 96 are capable of separating. The notched portions 97 are formed in the pedestal portions 93B and 94B on the sides (rear), whereby such a structure in which the fastening members 96 are capable of separating therefrom is adopted. That is to say, when the vehicle 100 receives a rear collision, the rear floor 21 changes like being folded in order to absorb an impact. The notched portions 97 of the fixing members 91 and 92 absorb such an impact, and prevent the casing 71 of the external power feeding device 70 from being broken. Moreover, as shown in FIG. 2, an ISO bar 110 is present in front of the external power feeding device 70. In this point, the pedestal portions 93A and 94A on the front side are fixed, and accordingly, prevent the external power feeding device 70 from interfering with the ISO bar 110 and being broken.

Referring to FIG. 1 and FIG. 2 one more time, a description is made of features in terms of disposition in the first embodiment. As shown in FIG. 2, the vehicle 100 defines a positional relationship of the external power feeding device 70 in the vehicle length direction with respect to the secondary battery 60 and the high-pressure tank 51. That is to say, the external power feeding device 70 is disposed in the rear of the ISO bar 110 provided on the rear of the seat back 23 of the rear seat 22, and in addition, is disposed in front of a rear end 61 of the secondary battery 60. Moreover, the external power feeding device 70 is disposed below a lower end 62 of the secondary battery 60 (that is, below in the vertical direction in a case where the vehicle is disposed on the horizontal plane). Furthermore, the external power feeding device 70 is disposed in front of a normal from the secondary battery 60, the normal being a straight line L passing through an axial center of the first high-pressure tank 51. More preferably, it is desired that the external power feeding device 70 be disposed in front of a front end 53 of the first high-pressure tank 51.

Next, a description is made of functions of the vehicle 100 according to the embodiment of the present invention with reference to FIG. 1 to FIG. 5. As shown in FIG. 1, the fuel cell stack 30 oxidizes hydrogen as fuel gas by an electrochemical process, and thereby converts energy, which is emitted following an oxidation reaction, directly into electric energy. The fuel cell vehicle 100 that mounts the fuel cell system 10 as a power source thereon runs by driving the traction motor 40 by electricity generated in the fuel cell stack 30.

Moreover, in a case where output power of the fuel cell stack 30 is larger than required power for the fuel cell stack 30, the fuel cell system 10 accumulate such surplus power in the secondary battery 60, and in a case where the output power of the fuel cell stack 30 is smaller than the required power, the secondary battery 60 compensates a shortage thereof. That is to say, the electric power is supplied to the traction motor 40 from both of the fuel cell stack 30 and the secondary battery 60 or from only the fuel cell stack 30, and meanwhile, in a low output region where the power generation is inefficient, the power generation of the fuel cell stack 30 is temporarily paused, and the electric power is supplied to the traction motor 40 from only the secondary battery 60.

Moreover, the electric power generated by the fuel cell stack 30 of the fuel cell vehicle 100 can be fed to the outside through the external power feeding device 70. The external power feeding device 70 is mounted on the rear floor 21 through the fixing members 91 and 92. The external power feeding device 70 is mounted on the rear floor 21, and accordingly, it is not necessary to adopt a waterproof structure for the external power feeding device 70. Moreover, the external power feeding device 70 is mounted on the rear floor 21, and accordingly, it is not necessary to provide the rear floor 21 with openings for taking wires, which come from the AC output unit 85 and the DC output connectors 81, into the vehicle cabin. Moreover, the external power feeding device 70 has a mass since a relay and a fuse are stored therein, and it is difficult to provide the external power feeding device 70 on an upper back of the rear floor 21. In this point, as shown in FIG. 2, the seat back 23 of the rear seat 22 is inclined rearward with height, and accordingly, it is most easy to ensure a mounting space immediately above the rear floor 21, and this is preferable as an installation place of the external power feeding device 70.

Moreover, the external power feeding device 70 is mounted in front of the rear end 61 of the secondary battery 60. This is in order to configure the vehicle so that the vehicle can be easily deformable at a time of the collision and to maximize a crushable zone for absorbing energy at the time of the collision in such a manner that the external power feeding device 70 is disposed in front of the rear end 61 of the secondary battery 60. Moreover, this is in order to eliminate a difference in functions and effects, which may be caused depending on the presence of options applied with configurations different for each specification.

In accordance with the vehicle 100 according to the first embodiment, the external power feeding device 70 is disposed in front of the rear end 61 of the secondary battery 60, and is disposed below the lower end 62 of the secondary battery 60 in the vertical direction. In the vehicle 100 according to this embodiment, in a case of receiving the rear collision, a first impact is applied to the secondary battery 60, and the secondary battery 60 passes above the external power feeding device 70, slides forward, and releases the impact. Hence, in accordance with the vehicle 100 according to the first embodiment, the impact by the secondary battery 60 can be prevented from being directly inputted to the external power feeding device 70, and the external power feeding device 70 can be protected.

Modification Example

In the first embodiment, the external power feeding device 70 is disposed in front of the normal from the secondary battery 60, the normal being the straight line L passing through a circle center portion of a cross section of the first high-pressure tank 51. More preferably, the external power feeding device 70 is disposed in front of the front end 53 of the first high-pressure tank 51. If the external power feeding device 70 is disposed between the high-pressure tank 51 and the secondary battery 60, then in a case where the high-pressure tank 51 and the secondary battery 60 approach each other along the normal, the external power feeding device 70 is sandwiched between the high-pressure tank 51 and the secondary battery 60, and receives a large load. In this point, in accordance with the vehicle 100 according to the first embodiment, the external power feeding device 70 is disposed in front of the normal from the secondary battery 60, the normal being the straight line L passing through the circle center portion of the cross section of the first high-pressure tank 51, the external power feeding device 70 can be prevented from being sandwiched between the high-pressure tank 51 and the secondary battery 60 and receiving the load. In a case where the high-pressure tank 51 and the secondary battery 60 approach each other without going along the normal, force acts diagonally on a bottom surface of the secondary battery 60. Hence, even if the external power feeding device 70 is sandwiched between the high-pressure tank 51 and the secondary battery 60, the force can be released, or can be converted into force to push the external power feeding device 70 to the outside.

Second Embodiment

A second embodiment relates to a form in the first embodiment, in which the notched portions 97 are formed in the pedestal portions 93B and 94B on the side (rear) of the fixing members 91 and 92 of the external power feeding device 70. In accordance with the vehicle 100 of the second embodiment, even in a case where the rear floor 21 immediately under the external power feeding device 70 is folded by the rear collision, the external power feeding device 70 is separated from the rear floor 21 by the notched portions 97, and accordingly, the impact can be prevented from being directly inputted to the external power feeding device 70, and the external power feeding device 70 can be protected.

In accordance with the vehicle 100 according to the second embodiment, the positional relationship of the external power feeding device 70 in the vehicle length direction is defined in relation with the secondary battery 60, the high-pressure tank 50 and the like, whereby such an excellent effect can be exerted that the impact can be prevented from being directly inputted by the rear collision to the external power feeding device 70, and the external power feeding device 70 can be protected.

Third Embodiment

Figure 6:
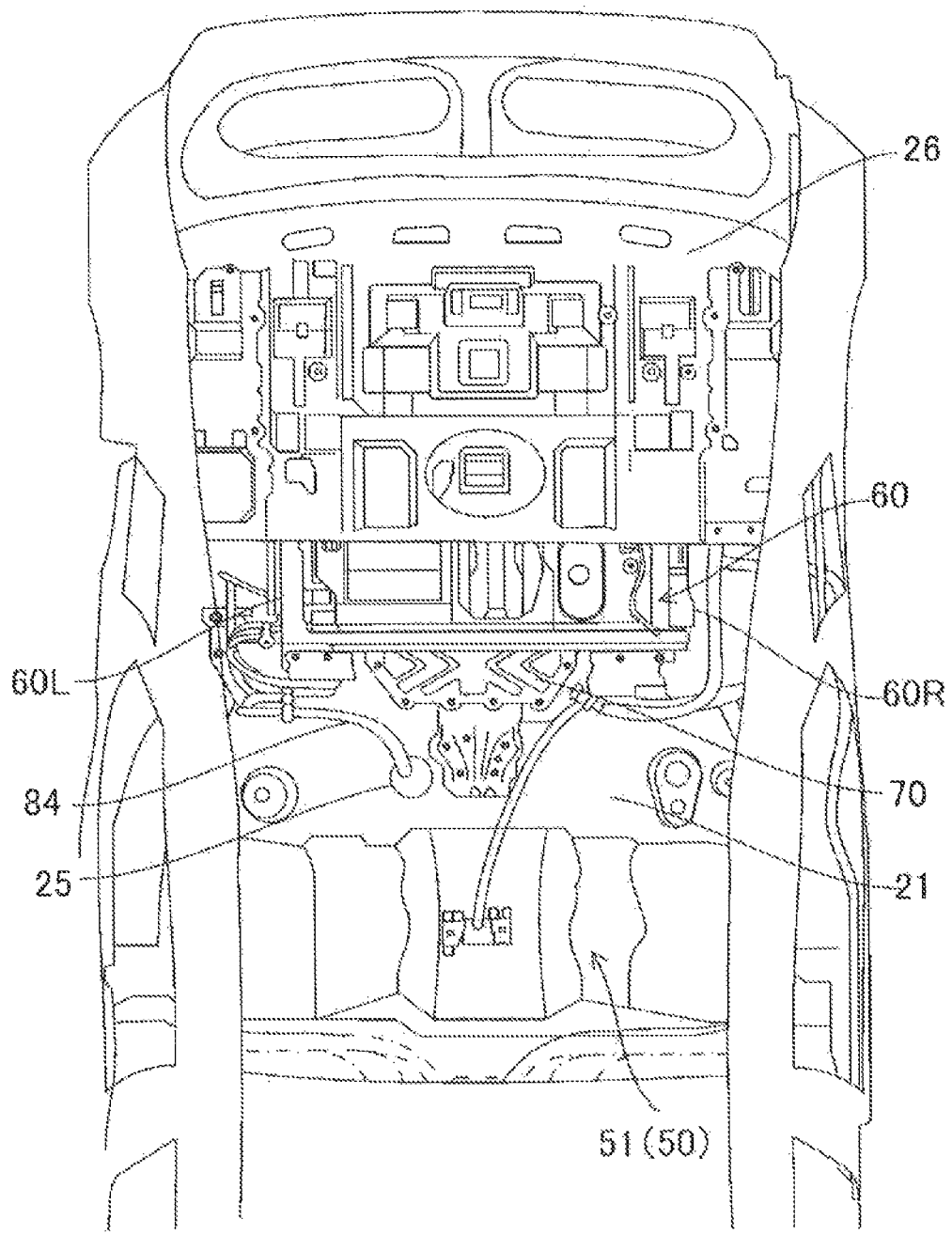
FIG. 6 is a plan view of a state of a vehicle after an upper back is installed therein, the vehicle including an external power feeding device according to a second embodiment of the present invention.
Figure 7:
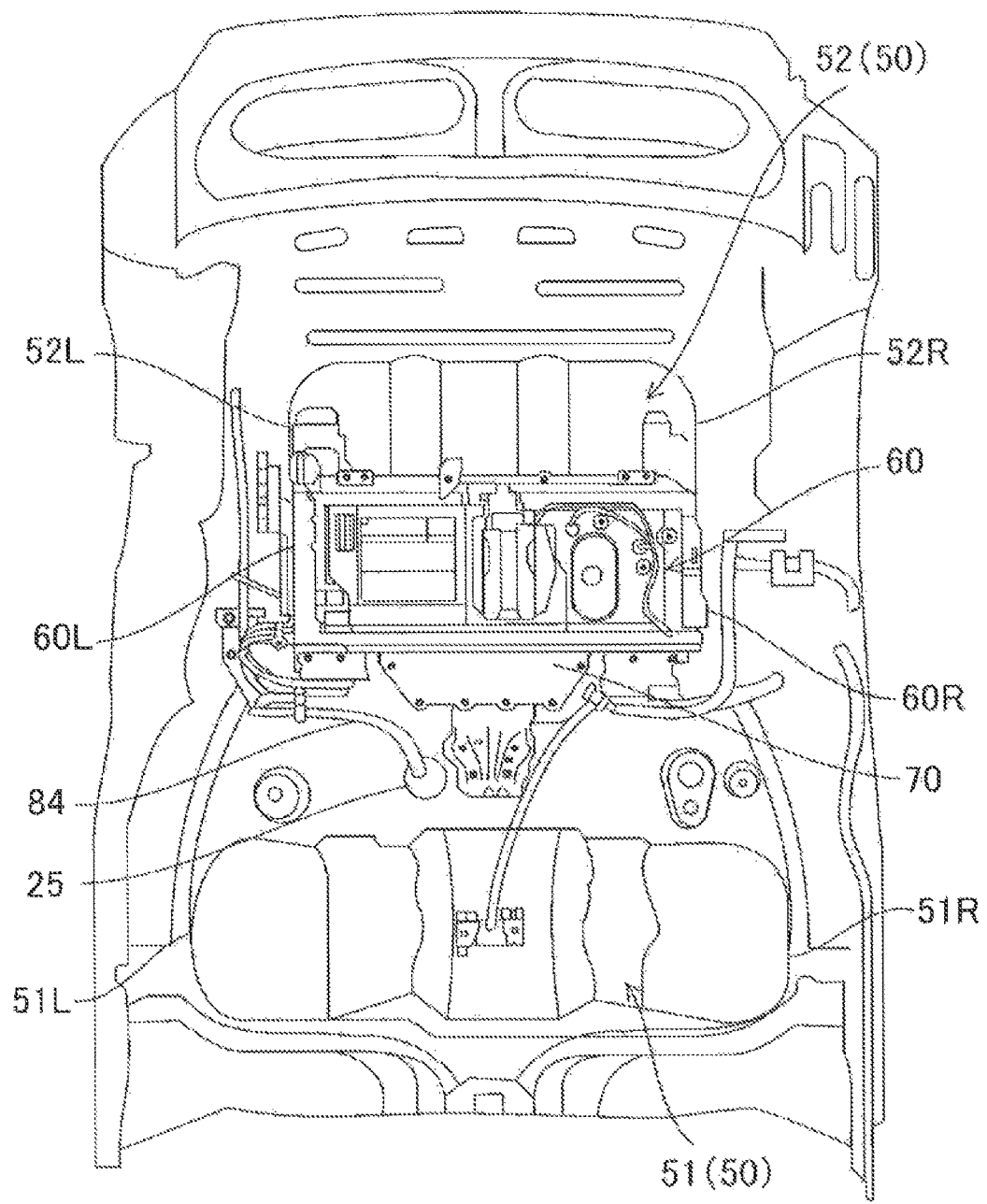
FIG. 7 is a plan view of a state of the vehicle before the upper back is installed therein, the vehicle including the external power feeding device according to the second embodiment of the present invention.
Figure 8:
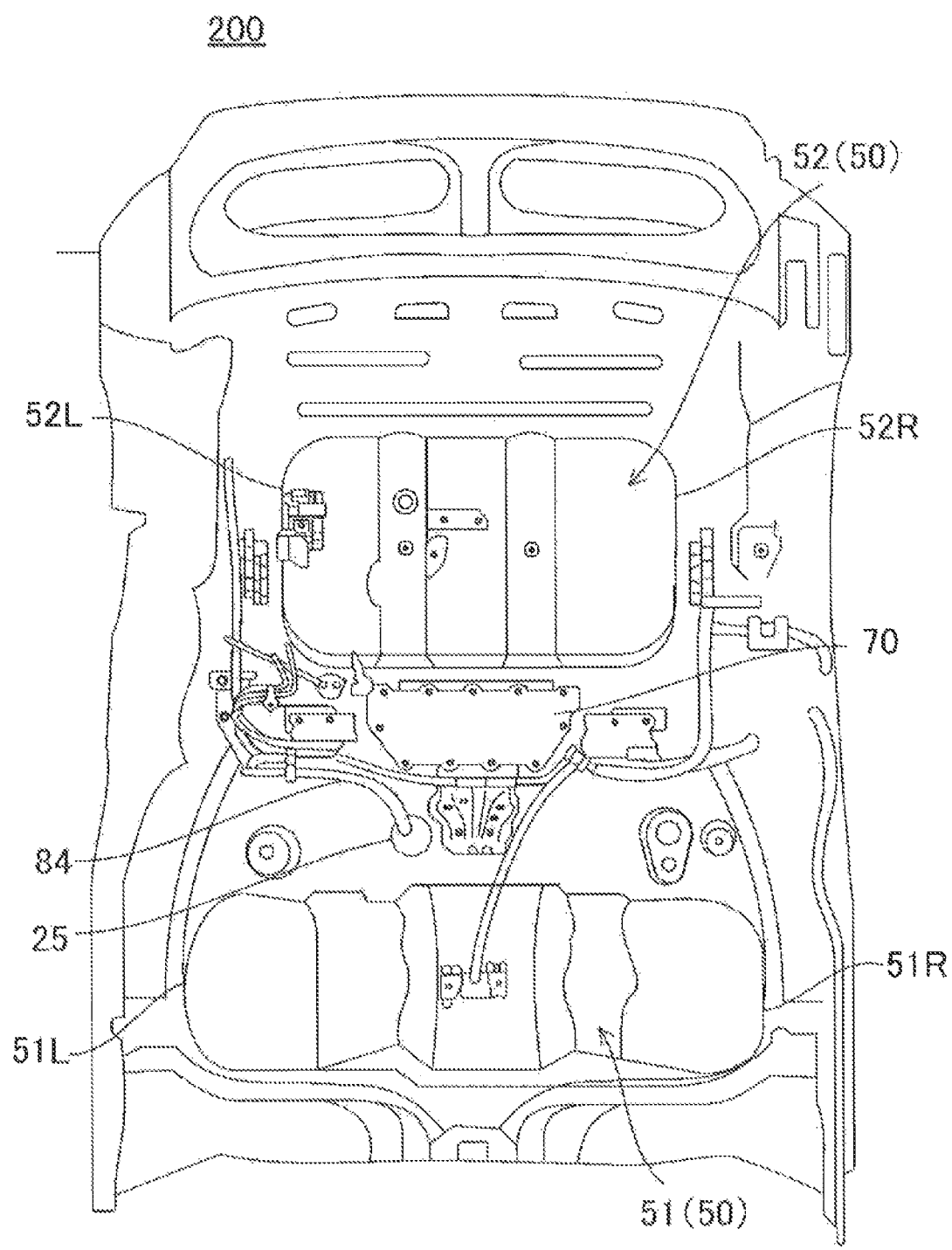
FIG. 8 is a plan view of a state of the vehicle before a secondary battery is mounted thereon, the vehicle including the external power feeding device according to the second embodiment of the present invention.
Figure 9:
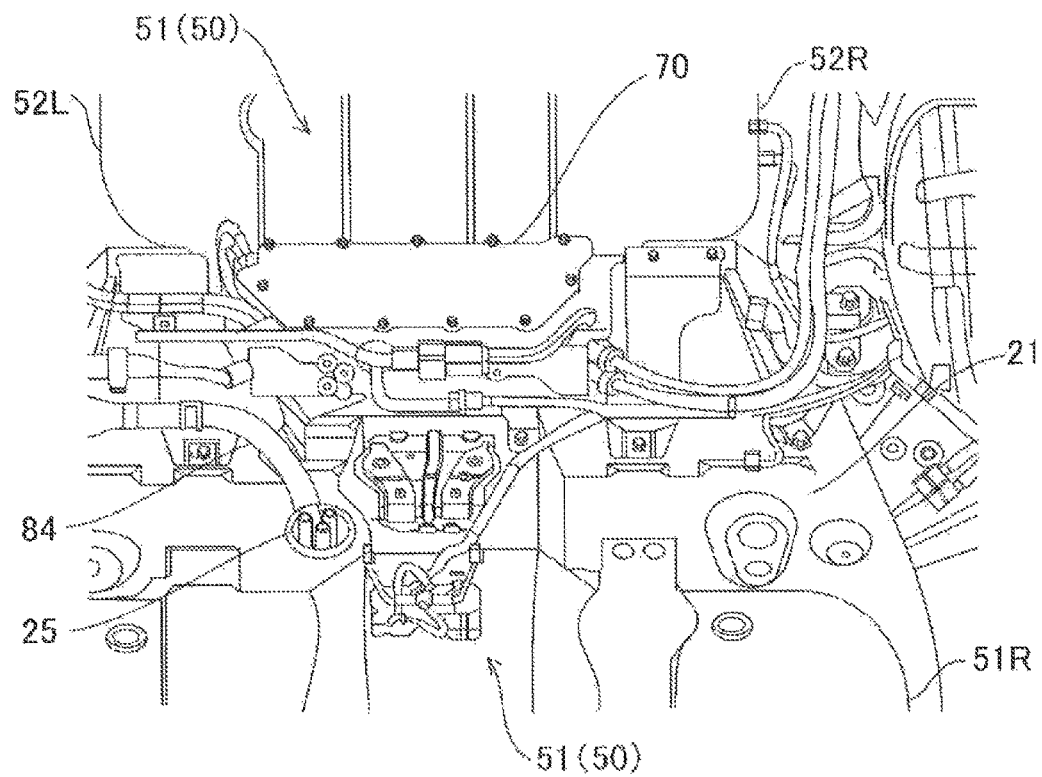
FIG. 9 is a view of a state of the vehicle before the secondary battery is mounted thereon, the state being when viewed from front, the vehicle including the external power feeding device according to the second embodiment of the present invention.
Figure 10:
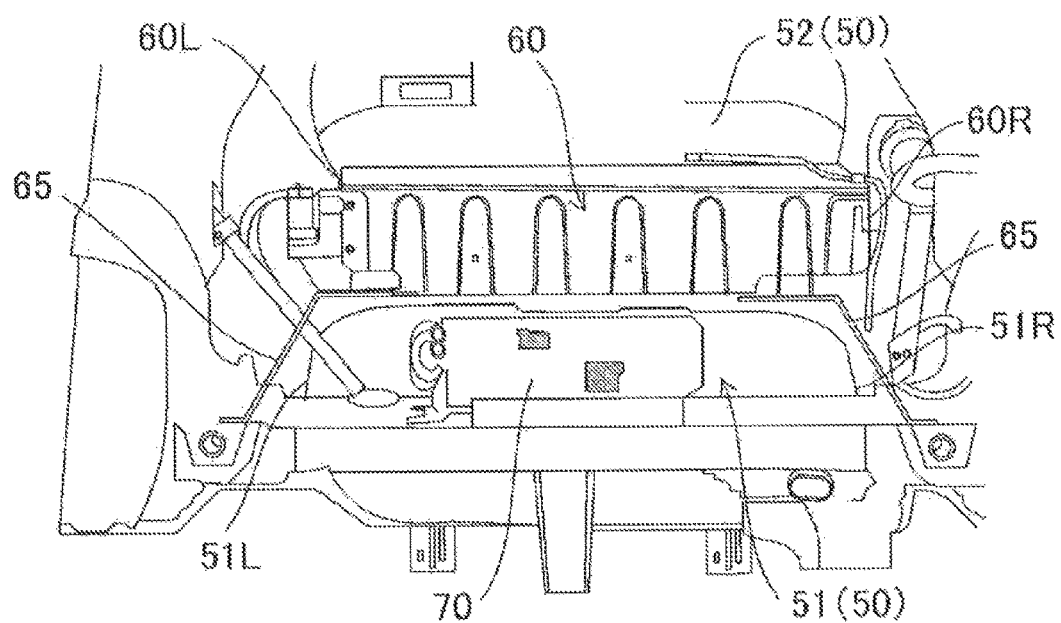
FIG. 10 is a rear view of a state of the vehicle, where a rear door is opened, the vehicle including the external power feeding device according to the second embodiment of the present invention.

Next, a description is made of a vehicle including an external power feeding device according to a third embodiment of the present invention with reference to FIG. 6 to FIG. 10. FIG. 6 is a plan view of the vehicle including the external power feeding device according to the third embodiment of the present invention in a state after an upper back is installed. FIG. 7 is a plan view of the vehicle including the external power feeding device according to the third embodiment of the present invention in a state before the upper back is installed therein. FIG. 8 is a plan view of the vehicle including the external power feeding device according to the third embodiment of the present invention in a state before a secondary battery is mounted thereon. FIG. 9 is a view of a state of the vehicle before the secondary battery is mounted thereon, the state being when viewed from front, the vehicle including the external power feeding device according to the third embodiment of the present invention. FIG. 10 is a rear view of a state of the vehicle, where a rear door is opened, the vehicle including the external power feeding device according to the third embodiment of the present invention. Note that the same constituents as those of the first embodiment are described while assigning the same reference numerals thereto.

As shown in FIG. 6 to FIG. 10, a vehicle 200 of the third embodiment is different from that of the first embodiment in that a positional relationship of the external power feeding device 70 in a vehicle width direction is defined in relation with the secondary battery 60 and the high-pressure tank 50. As shown in FIG. 6, all of the secondary battery 60, the external power feeding device 70 and the high-pressure tank 50 are disposed in a space between an upper back 26 and the rear floor 21. That is to say, as shown in FIG. 7 and FIG. 10, in the vehicle 200 of the second embodiment, the external power feeding device 70 is disposed in an inside in the vehicle width direction from both ends (right end 60R and left end 60L) of the secondary battery 60 in the vehicle width direction. Alternatively, as shown in FIG. 7, FIG. 8, FIG. 9 and FIG. 10, the external power feeding device 70 is disposed in an inside in the vehicle width direction from right ends 51R and 52R and left ends 51L and 52L of the high-pressure tank 50 (51, 52) in the vehicle width direction. This is in order to configure the vehicle so that the vehicle can be easily deformable and to maximize the crushable zone for absorbing the energy at the time of the collision. In other words, this is in order to eliminate the difference in functions and effects, which may be caused depending on the presence of options applied with configurations different for each specification.

In the vehicle 200 of the third embodiment, the external power feeding device 70 is disposed in an inside in the vehicle width direction from the right end 60R and left end 60L of the secondary battery 60 in the vehicle width direction and from the right ends 51R and 52R and left ends 51L and 52L of the high-pressure tank 50 (51, 52) in the vehicle width direction. In this embodiment, a setting is made so that both ends of the external power feeding device 70 in the vehicle width direction cannot protrude from the secondary battery 60 or/and the high-pressure tank 50 (51, 52). However, the present invention is not limited to this, and only one side of the external power feeding device 70 in the vehicle width direction may be disposed in the inside in the vehicle width direction from the right end 60R or left end 60L of the secondary battery 60 in the vehicle width direction or/and from the right ends 51R and 52R or left ends 51L and 52L of the high-pressure tank 50 (51, 52) in the vehicle width direction. Even in such a case where one side of the external power feeding device 70 in the vehicle width direction does not protrude from the secondary battery 60 or/and the high-pressure tank 50 (51, 52), a load against a side collision does not rise to a large extent.

The front and rear of the external power feeding device 70 are disposed in a similar way to those of the first embodiment. That is to say, as shown in FIG. 9, in the external power feeding device 70, the DC output connectors 81 and the PCU output connectors 82 are disposed so as to face obliquely to the front of the vehicle. Moreover, as shown in FIG. 6 to FIG. 9, it is preferable that the external power feeding device 70 be disposed in the rear of a through portion 25 of the rear floor 21 for the output cables (battery cables) 84 oriented to the secondary battery 60. This is because, on the premise that the PCU is located in a front portion of the vehicle, a length of the cable becomes shortest if the external power feeding device 70 is present between the secondary battery 60 and the through portion 25 of the rear floor 21 for the battery cables 84, bringing wiring efficiency.

In accordance with the vehicle 200 according to the third embodiment, the positional relationship of the external power feeding device 70 in the vehicle width direction is defined in relation with the secondary battery 60 and the high-pressure tank 50, whereby, in a case where the vehicle 200 receives the side collision, a first impact is applied to one or both of the secondary battery 60 and the high-pressure tank 50 (51, 52), and accordingly, such an excellent effect can be exerted that the impact can be prevented from being directly inputted to the external power feeding device 70, and the external power feeding device 70 can be protected.

Other Embodiments

As above, the present invention has been described by the embodiments; however, it should not be understood that the description and the drawings, which from a part of this disclosure, limit the present invention. From this disclosure, a variety of alternative embodiments, examples and operation technologies will be obvious for those skilled in the art. For example, in the first embodiment, the positional relationship of the external power feeding device 70 in the vehicle length direction is defined in relation with the secondary battery 60, the high-pressure tank 50 and the like, and in the third embodiment, the positional relationship of the external power feeding device 70 in the vehicle width direction is defined in relation with the secondary battery 60 and the high-pressure tank 50. That is to say, the positional relationships of the first and third embodiments are combined with each other, whereby the external power feeding device 70 can be mounted in a mode of not protruding from the lower side of the secondary battery 60, the upper side of the rear floor 21, the rear side of the seat back 23 of the rear seat 22, the front side of the secondary battery 60, and the outside in the vehicle width direction from the secondary battery 60 and the high-pressure tank 50 (51, 52). In such a way, the vehicle becomes capable of coping with the side collision and the rear collision efficiently, the impact can be prevented from being directly inputted to the external power feeding device 70, and the external power feeding device 70 can be protected. As described above, it should be understood that the present invention incorporates a variety of embodiments and the like, which are not described herein.

In a similar way, each of the above-described first to third embodiments may be configured to be realized by arbitrarily combining a plurality of the embodiments.

21 rear floor
30 fuel cell
50, 51, 52 high-pressure tank
51R, 52R right end of the high-pressure tank
51L, 52L left end of the high-pressure tank
60 secondary battery
60R right end of the secondary battery
60L left end of the secondary battery
70 external power feeding device
91, 92 fixing member
97 notched portion
100, 200 vehicle

What is claimed is:
1. A vehicle comprising:
an external power feeding device that stores a high-voltage component for performing external power feeding, the external power feeding device comprising a relay and a fuse, and being provided in a rear of a seat in a vehicle length direction and being mounted above a floor of the vehicle; and
a secondary battery that stores a part of electric power, the secondary battery being provided in the rear of the seat in the vehicle length direction,
wherein a rear end of the external power feeding device is disposed in front of a rear end of the secondary battery in the vehicle length direction, and the external power feeding device is disposed below a lower end of the secondary battery when viewed from a side, and wherein the front in the vehicle length direction is in a travel direction of the vehicle and the rear in the vehicle length direction is opposite the front.

2. The vehicle according to claim 1, further comprising:
a high-pressure tank for reserving fuel, the high-pressure tank being provided in the rear of the seat in the vehicle length direction,
wherein the external power feeding device is disposed in front of a normal from the secondary battery, the normal being a straight line passing through an axial center of the high-pressure tank.

3. The vehicle according to claim 2, wherein the external power feeding device is disposed in front of a front end of the high-pressure tank.

4. A vehicle comprising:
an external power feeding device that stores a high-voltage component for performing external power feeding, the external power feeding device comprising a relay and a fuse, and being provided in a rear of a seat in a vehicle length direction and being mounted above a floor of the vehicle; and
a secondary battery that stores a part of electric power, the secondary battery being provided in the rear of the seat in the vehicle length direction,
wherein a rear end of the external power feeding device is disposed in front of a rear end of the secondary battery in the vehicle length direction, the external power feeding device is disposed below a lower end of the secondary battery when viewed from a side, and is disposed through a fixing member on the floor in a rear in the vehicle length direction, and a notched portion is provided in the fixing member, and
wherein the front in the vehicle length direction is in a travel direction of the vehicle and the rear in the vehicle length direction is opposite the front.

5. A vehicle comprising:
an external power feeding device that stores a high-voltage component for performing external power feeding, the external power feeding device comprising a relay and a fuse, and being provided in a rear of a seat in a vehicle length direction and being mounted above a floor of the vehicle; and
a secondary battery that stores a part of electric power, the secondary battery being provided in the rear of the seat in the vehicle length direction,
wherein a rear end of the external power feeding device is disposed in front of a rear end of the secondary battery in the vehicle length direction, the external power feeding device is disposed below a lower end of the secondary battery when viewed from a side, and is disposed in an inside in a vehicle width direction from both ends of either one or both of the secondary battery and the high-pressure tank, and
wherein the front in the vehicle length direction is in a travel direction of the vehicle and the rear in the vehicle length direction is opposite the front.

* * * * *